United States Patent
Aochi et al.

(10) Patent No.: US 9,329,994 B2
(45) Date of Patent: May 3, 2016

(54) MEMORY SYSTEM

(71) Applicant: Kabushiki Kaisha Toshiba, Minato-ku (JP)

(72) Inventors: Masami Aochi, Yokohama (JP); Yoshihisa Kojima, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 143 days.

(21) Appl. No.: 14/305,206

(22) Filed: Jun. 16, 2014

(65) Prior Publication Data

US 2015/0234740 A1  Aug. 20, 2015

Related U.S. Application Data

(60) Provisional application No. 61/942,449, filed on Feb. 20, 2014.

(51) Int. Cl.
*G06F 12/00* (2006.01)
*G06F 12/02* (2006.01)
*G06F 12/10* (2016.01)

(52) U.S. Cl.
CPC ........ *G06F 12/0246* (2013.01); *G06F 12/1027* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 8,417,904 B2 | 4/2013 | Goss et al. | |
| 2011/0082988 A1* | 4/2011 | Kono | G06F 3/0605 711/161 |
| 2013/0145076 A1 | 6/2013 | Chiueh et al. | |
| 2013/0198439 A1 | 8/2013 | Kurotsuchi et al. | |
| 2015/0205727 A1* | 7/2015 | Kimmel | G06F 3/0611 711/103 |

FOREIGN PATENT DOCUMENTS

| | | |
|---|---|---|
| JP | 2010-176702 | 8/2010 |
| JP | 2013-152676 | 8/2013 |

* cited by examiner

*Primary Examiner* — Brian Peugh
(74) *Attorney, Agent, or Firm* — Oblon, McClelland, Maier & Neustadt, L.L.P.

(57) ABSTRACT

According to one embodiment, a memory system includes a first memory, a second memory, a third memory, and a memory controller. The first memory includes a plurality of blocks. The second memory stores a first table having a plurality of first correspondences between a logical address and a physical address. The third memory has a higher processing speed than the second memory and stores a second table having second correspondences which are parts of the first correspondences. The memory controller determines whether data in a written block is first data to be copied, using the first table, not the second table. The memory controller copies the first data from the written block to a writable block to copy all data in a first state in the second block to the writable block. The memory controller sets all data in the written block to a second state.

13 Claims, 7 Drawing Sheets

MEMORY SYSTEM

CROSS-REFERENCE TO RELATED APPLICATIONS

This application is based upon and claims the benefit of priority from U.S. Provisional Application No. 61/942,449, filed on Feb. 20, 2014; the entire contents of which are incorporated herein by reference.

FIELD

Embodiments described herein relate generally to a memory system.

BACKGROUND

A solid-state drive (SSD) including a NAND flash memory (hereinafter, referred to as a NAND memory) has been known as a memory system. In the SSD, relations between a logical address and a physical page are not fixed. The logical address is designated as a reading and writing position by the host. In the SSD, a physical address space corresponding to the physical page is provided and a memory controller provided in the SSD performs the mapping between the logical address and the physical address. The mapping between the logical address and the physical address is recorded in the translation table and is stored in the SSD.

DETAILED DESCRIPTION

In general, according to one embodiment, a memory system includes a first memory, a second memory, a third memory, and a memory controller. The first memory includes a plurality of first blocks to which data is written from the outside, erasing being performed for each first block. The second memory stores a first table in which a plurality of first correspondences between a logical address and a physical address of a writing position of the data is described. The third memory has a higher processing speed than the second memory and stores a second table in which second correspondences are described. The second correspondences are parts of the first correspondences. The memory controller preferentially uses the second table over the first table to acquire a physical address of an access destination when accessing the first memory in response to a request from the outside. The memory controller determines whether data in a second block is first data to be copied, using the first table, not the second table. The second block is a written block among the plurality of first blocks. The memory controller copies the first data from the second block to a third block to copy all data in a first state in the second block to the third block. The third block is a writable block among the plurality of first blocks. The memory controller sets all data in the second block to a second state.

Exemplary embodiments of a memory system will be explained below in detail with reference to the accompanying drawings. The present invention is not limited to the following embodiments.

Figure 1:
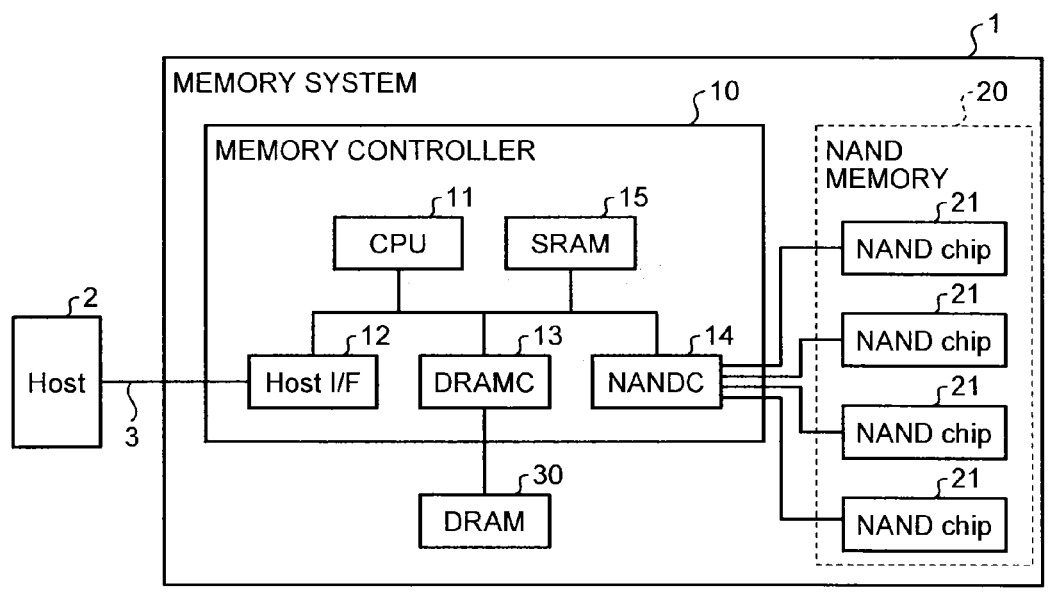
FIG. 1 is a diagram illustrating an example of the structure of a memory system according to an embodiment.

FIG. 1 is a diagram illustrating an example of the structure of a memory system according to an embodiment. A memory system 1 is connected to a host 2 through a communication path 3. The host 2 is, for example, a computer. The term "computer" includes a personal computer, a portable computer, or a portable communication device and the like. The memory system 1 functions as an external storage device of the host 2. The communication path 3 is based on any interface standard. The host 2 can issue a write command and a read command to the memory system 1.

The memory system 1 includes a memory controller 10, a NAND flash memory (NAND memory) 20 which is used as storage, and a dynamic random access memory (DRAM) 30. The type of memory used as the storage is not limited to the NAND flash memory. For example, a NOR flash memory, a resistance random access memory (ReRAM), or a magnetoresistive random access memory (MRAM) can be used.

The NAND memory 20 includes one or more NAND chips 21 having a memory cell array. The memory cell array includes a plurality of memory cells arranged in a matrix. Each memory cell array is formed by arranging a plurality of blocks, each of which is the unit of an erase operation. Each block is formed by arranging a plurality of pages, each of which is the unit of a read and write operation for the memory cell array. Each page has a size that is a multiple of the size of a cluster which is smaller than the page. That is, data with a page size including a plurality of cluster data is stored in each page.

In the NAND memory 20, erasing is performed by a block unit. Therefore, when the same logical address as that of first data in the state in which the first data is stored in the NAND memory 20, is designated by the host 2 and second data is written thereto, the first data is not erased, the second data is written to a blank page, and the first data becomes invalid data. Since data is written to the NAND memory 20 in this way, invalid data and valid data are mixed in each block. Valid data means that the data is in the latest state. In some cases, the same logical address is designated and a plurality of written data is stored in the NAND memory 20. The latest state means the state of the last data which is written by the host 2 among the plurality of data. Invalid data means that the data is not the latest by addition and also means the state of data other than the last data which is written by the host 2 among the plurality of data. When there is a logical address which is designated only once, data which is written to the designated logical address is in the latest state.

The memory controller 10 receives a command from the host 2. Then, the memory controller 10 transmits data between the host 2 and the NAND memory 20 in response to the received command.

The DRAM 30 stores a management table which is used by the memory controller 10 to translate a logical address into a physical address. The management table will be described in detail below. The memory controller 10 uses the DRAM 30 as a buffer for data transmission between the host 2 and the NAND memory 20.

The memory controller 10 includes a central processing unit (CPU) 11, a host interface (host I/F) 12, a DRAM controller (DRAMC) 13, a NAND controller (NANDC) 14, and a static random access memory (SRAM) 15. The CPU 11, the host I/F 12, the DRAMC 13, the NANDC 14, and the SRAM 15 are connected to each other by a bus.

The host I/F 12 controls the communication path 3. In addition, the host I/F 12 receives a command from the host 2. The host I/F 12 transmits data between the host 2 and the DRAM 30.

The DRAMC 13 is a controller which is used by the memory controller 10 to access the DRAM 30.

The CPU 11 executes a firmware program to control the overall operation of the memory controller 10. As a control operation, the CPU 11 generates a command for the NAND memory 20 in response to the command which is received from the host 2 by the host I/F 12 or the internal process of the memory system 1 and transmits the generated command to the NANDC 14.

The internal process of the memory system 1 includes compaction. The compaction is a process for creating a free block. For example, the compaction is a process of collecting valid data from one or more written blocks and copying the collected valid data to other blocks. As such, the process of collecting the area of use of data and transferring the collected area of use of data to other blocks is performed to create a free block.

Figure 2:
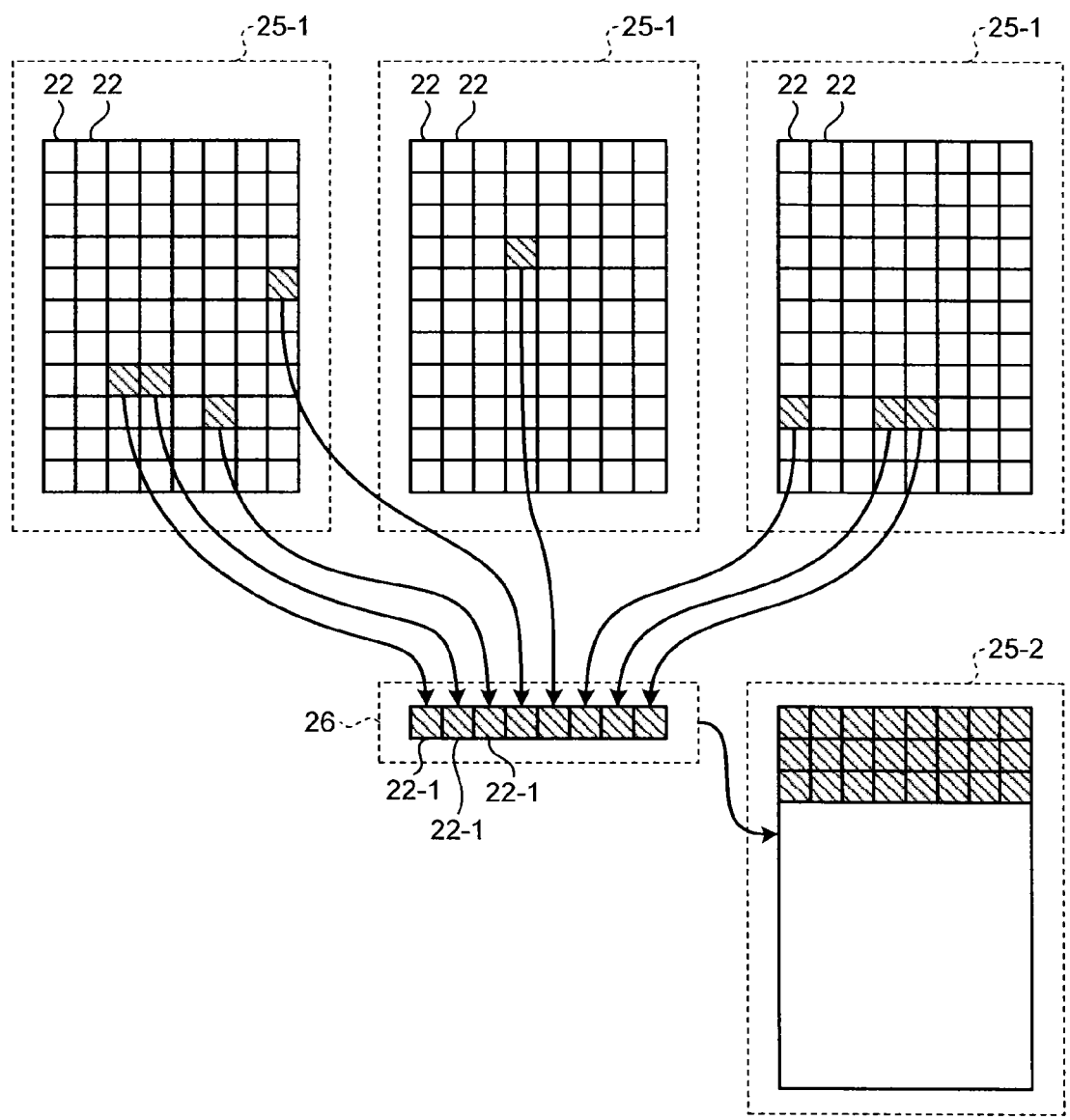
FIG. 2 is a diagram illustrating compaction.

FIG. 2 is a diagram illustrating the compaction. In the NAND memory 20, in each block, data is sequentially written to the pages from the first page. In three blocks 25-1, a plurality of data with a cluster size (cluster data 22) is stored from the top to the end of the block 25-1. That is, three blocks 25-1 are written blocks. Hatched cluster data 22-1 is valid data. In the compaction, the valid cluster data 22-1 is read from each block 25-1 and data with a page size (page data 26) is generated. For example, in this embodiment, the page has a size that is eight times greater than that of the cluster. The generated page data 26 is written to another block 25-2 having an unwritten page. After the cluster data 22-1 is copied to the block 25-2, the cluster data 22-1 is invalidated in each block 25-1. Then, all data is erased in each block 25-1 and each block 25-1 is used as a writable block.

For example, the CPU 11 executes compaction while considering the size of a region of the NAND memory 20 to which data is not written. For example, the CPU 11 monitors the size of a region of the NAND memory 20 to which data has not been written while writing data from the host 2 to the NAND memory 20. When the size of the region to which data is not written is not sufficient, the CPU 11 executes compaction. The CPU 11 may execute the compaction, with communication with the host 2 being kept waiting, or when the communication with the host 2 is not performed.

The NANDC 14 transmits the command received from the CPU 11 to the NAND memory 20. The NANDC 14 executes data transmission between the DRAM 30 and the NAND memory 20.

The SRAM 15 stores a portion of the management table stored in the memory controller 10.

Figure 3:
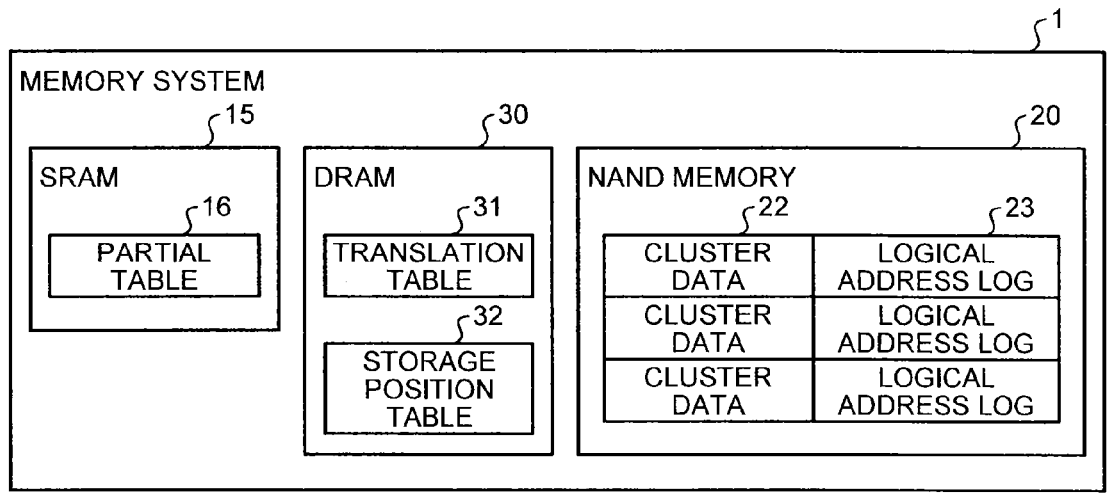
FIG. 3 is a diagram illustrating a management table stored in the memory system.

FIG. 3 is a diagram illustrating the management table stored in the memory system 1. The DRAM 30 stores a translation table 31 for translating a logical address into a physical address. The SRAM 15 stores a portion of the translation table 31 as a partial table 16. The unit of management in the translation table 31 is arbitrary. For example, in this embodiment, it is assumed that a key-value pair (hereinafter, simply referred to as a pair) having a logical address as a key and a physical address as a value is registered for each cluster in the translation table 31. The SRAM 15 is accessed by the CPU 11 at a higher speed than the DRAM 30. When a pair including the logical address to be translated as the key is present in the partial table 16, by searching the partial table 16, CPU 11 can calculate the physical address at a higher speed than by searching the translation table 31.

The DRAM 30 further stores a storage position table 32. The storage position table 32 is information indicating whether each pair is present in the partial table 16. The storage position table 32 may have any data structure. For example, the storage position table 32 indicates whether each pair in the partial table 16 or each pair registered in the translation table 31 is present in the partial table 16. For example, in order to reduce the size of the storage position table 32, information indicating whether each pair in a predetermined logical address range is present in the partial table 16 may be recorded in the storage position table 32.

As such, according to this embodiment, the management table has a hierarchized structure in which the partial table 16 is a first hierarchy table, and the translation table 31 is a second hierarchy table. The partial table 16, which is the first hierarchy table, is stored in the SRAM 15 which can be accessed at a higher speed than the DRAM 30 storing the translation table 31, which is the second hierarchy table. Therefore, the CPU 11 can translate the logical address into the physical address at a high speed.

The partial table 16, which is the first hierarchy table, may be stored in any type of memory device other than the SRAM as long as the memory device can be accessed at a higher speed than the DRAM 30 storing the translation table 31, which is the second hierarchy table.

The memory controller 10 manages the validating and invalidating of data. Specifically, when a write command is received from the host 2, the memory controller 10 (more exactly, the CPU 11) writes data which is requested to be written by the write command to the NAND memory 20 and sets the data to a valid state. In this embodiment, the setting of the data to the valid state means adding or updating a corresponding pair to the partial table 16 and operating the storage position table 32 so that the storage position of the pair is the partial table 16. When another data with the same designated logical address as the data is present in the NAND memory 20, another data is changed from a valid state to an invalid state by these processes.

The NAND memory 20 stores a logical address log 23 so as to be associated with each cluster data 22. The logical address log 23 is information indicating a logical address which is assigned to the cluster data 22 when the cluster data 22 is written. The CPU 11 refers to the logical address log 23 corresponding to the cluster data 22 with reference to the physical address of the cluster data 22 to check the logical address when the referred cluster data 22 is written. That is, the CPU 11 can translate the physical address of the cluster data 22 into a logical address with reference to the logical address log 23.

Hereinafter, an operation of translating a logical address into a physical address using the partial table 16 or the translation table 31 is referred to as a lookup. In addition, an operation of translating a physical address into a logical address using the logical address log 23 is referred to as a reverse lookup.

Figure 4:
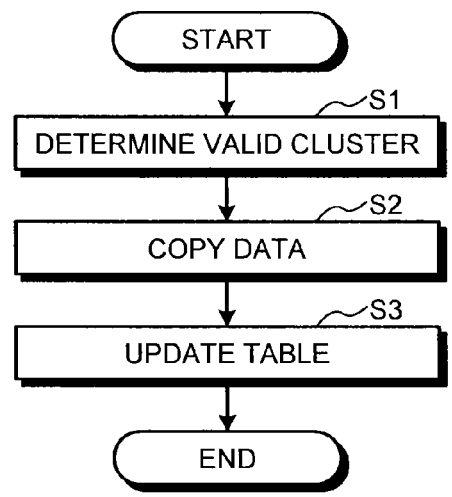
FIG. 4 is a flowchart illustrating a compaction operation of the memory system.

FIG. 4 is a flowchart illustrating the compaction operation of the memory system 1.

First, the CPU 11 executes a valid cluster determination process which checks each cluster data 22 stored in each block 25-1 and searches for valid cluster data 22-1 (S1). Then, the CPU 11 executes a data copy process which copying the searched valid cluster data 22-1 to a block 25-2 which is a copy destination (S2). In the process of S2, the CPU 11 copies each cluster data 22-1 and the logical address log 23. Then, the CPU 11 executes a table update process which updates the management table (the partial table 16 or the translation table 31) (S3). Then, the compaction operation terminates.

Figure 5:
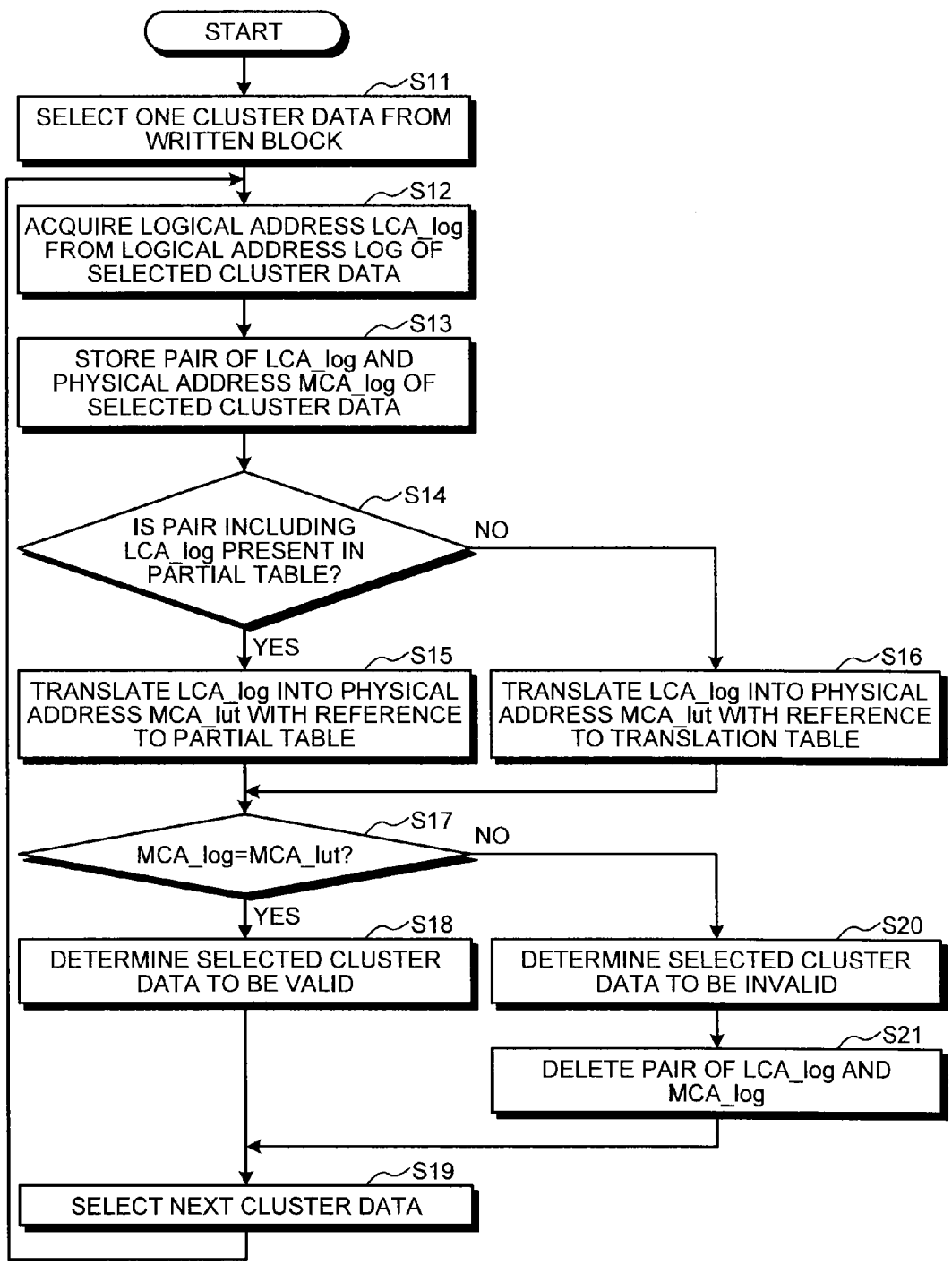
FIG. 5 is a flowchart illustrating an example (first method) of a valid cluster determination operation.

FIG. 5 is a flowchart illustrating an example (first method) of the valid cluster determination operation (S1). In the first method, the CPU 11 selects one cluster data 22 from the written block 25-1 (S11). Then, the CPU 11 acquires a logical address LCA_log from the logical address log 23 of the selected cluster data 22 (S12). The CPU 11 stores a pair of the logical address LCA_log and the logical address LCA_log at which the selected cluster data 22 is stored (S13). The physical address stored in the process of S13 is represented by MCA_log. LCA_log and MCA_log are stored in any memory. For example, LCA_log and MCA_log are stored in the SRAM 15, a memory (not illustrated) other than the SRAM 15, or a register (not illustrated) other than the SRAM 15.

Then, the CPU 11 determines whether the pair including LCA_log is present in the partial table 16 (S14). In the process of S14, the CPU 11 determines with reference to the storage position table 32, using LCA_log as the search key. When the pair including LCA_log is present in the partial table 16 (S14, Yes), the CPU 11 translates LCA_log into a physical address with reference to the partial table 16, using LCA_log as the search key (S15). When the pair including LCA_log is absent in the partial table 16 (S14, No), the CPU 11 translates LCA_log into a physical address with reference to the translation table 31, using LCA_log as the search key (S16). The physical address translated by the process in S15 or the process in S16 is represented by MCA_lut.

Following the process in S15 or the process in S16, the CPU 11 determines whether MCA_log is identical to MCA_lut (S17). When MCA_log is identical to MCA_lut (S17, Yes), the CPU 11 determines that the cluster data 22 selected by the process in S11 is valid (S18). Then, the CPU 11 selects the next cluster data 22 (S19) and executes the process in S12. When MCA_log is not identical to MCA_lut (S17, No), the CPU 11 determines that the cluster data 22 selected by the process in S11 is invalid (S20). Then, the CPU 11 deletes the pair of LCA_log and MCA_log stored by the process in S13 (S21) and executes the process in S19.

As such, the CPU 11 checks each cluster data 22, performs the reverse lookup and the lookup for the selected cluster data 22, and determines that the selected cluster data 22 is valid when the physical address MCA_log used for the reverse lookup is identical to the physical address MCA_lut searched by the lookup. When the selected cluster data 22 is invalid, the physical address MCA_log used for the reverse lookup is different from the physical address MCA_lut searched by the lookup.

Figure 6:
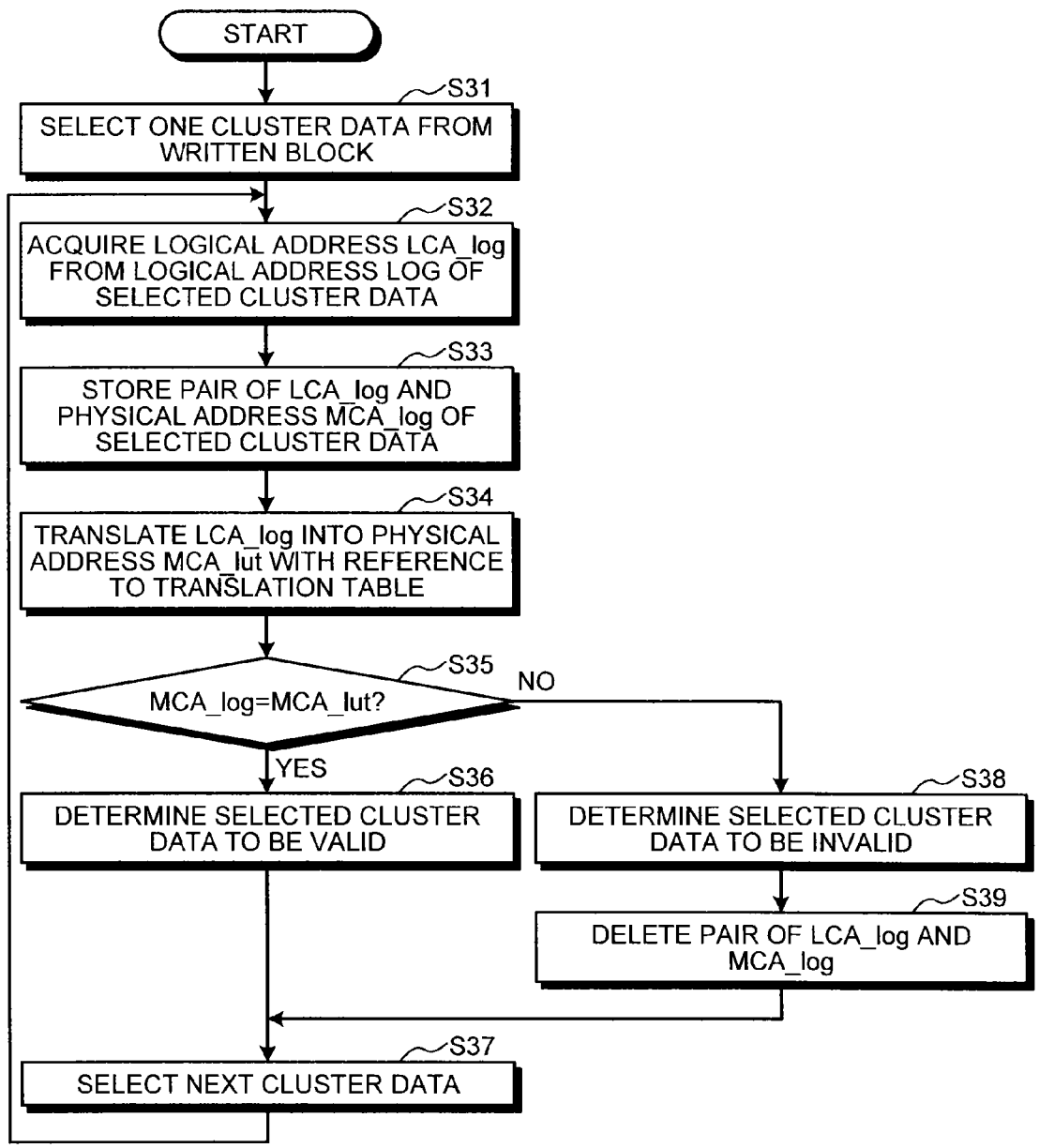
FIG. 6 is a flowchart illustrating another example (second method) of the valid cluster determination operation.

FIG. 6 is a flowchart illustrating another example (second method) of the valid cluster determination operation (S1). In the second method, the CPU 11 selects one cluster data 22 from the written block 25-1 (S31). Then, the CPU 11 acquires a logical address LCA_log from the logical address log 23 of the selected cluster data 22 (S32). The process in S32 may be the same as the process in S12. Then, the CPU 11 stores a pair of the logical address LCA_log and the physical address stored in the selected cluster data 22 (S33). The physical address stored in the process of S33 is represented by MCA_log.

Then, the CPU 11 translates LCA_log into a physical address with reference to the translation table 31, using LCA_log as the search key (S34). The physical address translated by the process in S34 is represented by MCA_lut.

Then, the CPU 11 determines whether MCA_log is identical to MCA_lut (S35). When MCA_log is identical to MCA_lut (S35, Yes), the CPU 11 determines that the cluster data 22 selected by the process in S31 is valid (S36). Then, the CPU 11 selects the next cluster data 22 (S37) and executes the process in S32. When MCA_log is not identical to MCA_lut (S35, No), the CPU 11 determines that the cluster data 22 selected by the process in S31 is invalid (S38). Then, the CPU 11 deletes the pair of LCA_log and MCA_log stored by the process in S33 (S39) and executes the process in S37.

As such, according to the second method, access to the storage position table 32 in the DRAM 30 in the first method is not needed. Therefore, the valid cluster determination process is performed at a high speed, as compared to the first method.

When writing data to the NAND memory 20 in response to the write command from the host 2, the CPU 11 updates the partial table 16. The content of the partial table 16 is reflected in the translation table 31 at any time. That is, in some cases, different physical addresses are searched for the same logical address from the partial table 16 and the translation table 31. In this case, the physical address which is translated using the partial table 16 indicates the latest value and the physical address which is translated using the translation table 31 indicates an older value than the physical address which is translated using the partial table 16. According to the second method, the lookup is performed using the translation table 31, not the partial table 16. Therefore, in some cases, in practice, the cluster data 22 which has been determined to be valid in the process of S36 is not valid.

The pair to be stored in the partial table 16 among the pair group included in the translation table 31 may be determined according to any rule and the pair to be stored in the partial table 16 among the pair group included in the translation table 31 may be copied to the partial table 16 at any time. For example, in a case in which the CPU 11 reads data from the NAND memory 20 in response to the read command from the host 2, when a corresponding pair is not present in the partial table 16, but is present in the translation table 31, the CPU 11 may not copy the pair from the translation table 31 to the partial table 16. When the locality of access to the memory system 1 is low, the possibility of the pair corresponding to the requested access being present in the partial table 16 is low. Therefore, when the pair corresponding to the requested access, which is not present in the partial table 16, is copied one by one from the translation table 31 to the partial table 16, it takes a lot of time for the copy and the reading performance deteriorate. When the copy of the pair from the translation table 31 to the partial table 16 is not performed during a reading operation, the reading performance is expected to be improved. When the locality of access is large, the CPU 11 copies a pair corresponding to access from the translation table 31 to the partial table 16, which makes it possible to improve the reading performance.

Figure 7:
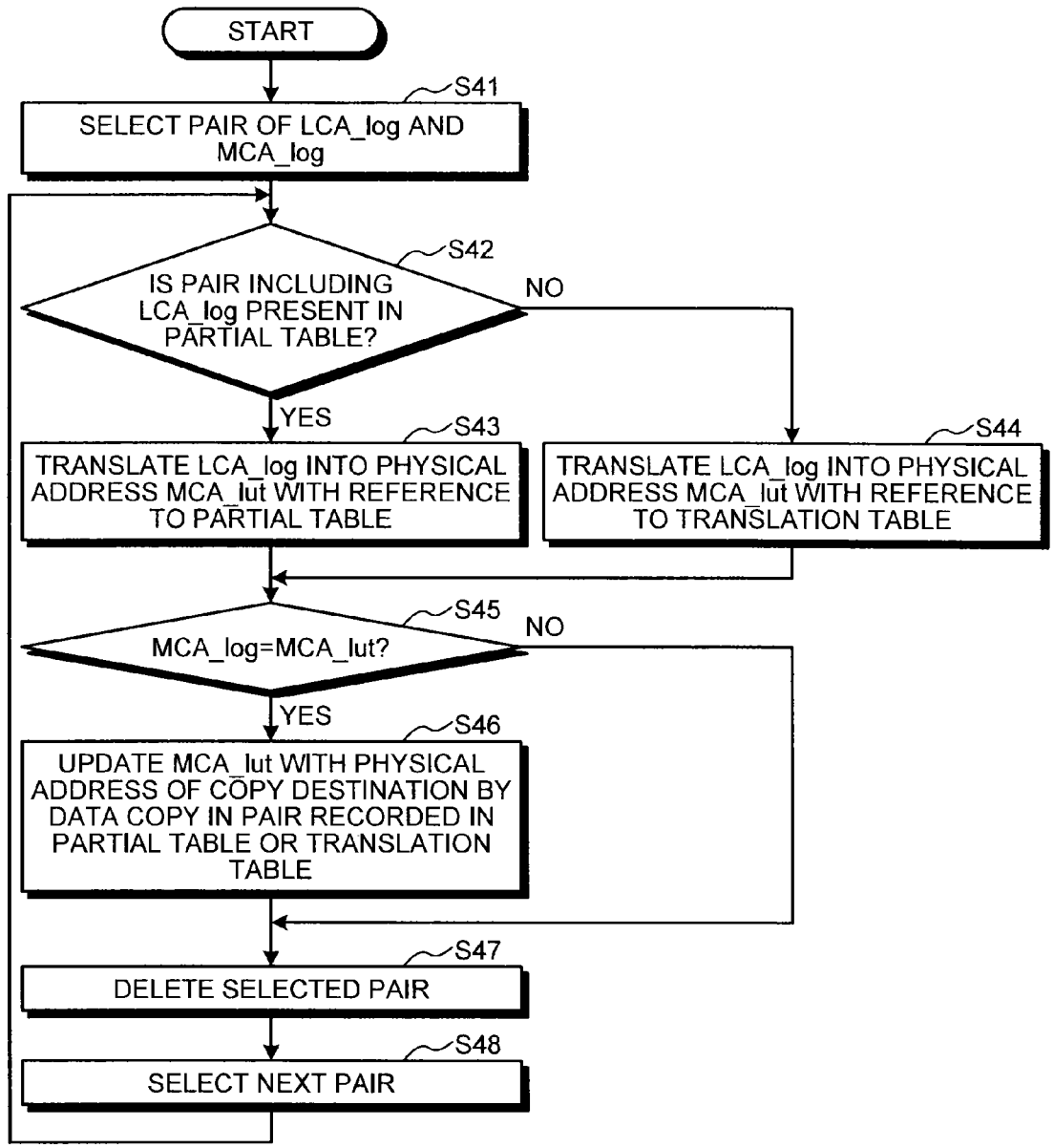
FIG. 7 is a flowchart illustrating an example of a table update operation.

FIG. 7 is a flowchart illustrating an example of the table update operation (S3). The CPU 11 selects one of the pairs of LCA_log and MCA_log stored by the process in S13 and the process in S33 (S41). Then, the CPU 11 determines whether a pair including LCA_log which is included in the selected pair is present in the partial table 16 (S42). In the process of S42, the CPU 11 determines with reference to the storage position table 32, using LCA_log as the search key. When the pair including LCA_log is present in the partial table 16 (S42, Yes), the CPU 11 translates LCA_log into a physical address with reference to the partial table 16, using LCA_log as the search key (S43). When the pair including LCA_log is not present in the partial table 16 (S42, No), the CPU 11 translates LCA_log into a physical address with reference to the translation table 31, using LCA_log as the search key (S44). The physical address translated by the process in S43 or the process in S44 is represented by MCA_lut.

Then, the CPU 11 determines whether MCA_log in the pair selected by the process in S41 is identical to MCA_lut (S45). When MCA_log is identical to MCA_lut (S45, Yes), the CPU 11 updates MCA_lut in the pair which includes LCA_log registered in the management table (the partial table 16 or the translation table 31) with the physical address of the copy destination of the cluster data 22-1 (S46).

The physical address of the copy destination of the cluster data 22-1 is stored in the CPU 11, for example, in the process of S2 so as to be associated with the pair of MCA_log and MCA_lut. The CPU 11 updates MCA_lut with the stored physical address of the copy destination.

When the pair is present in the partial table 16, the CPU 11 updates at least the partial table 16 in the process in S46. When the pair is not present in the partial table 16, the CPU 11 may add the updated pair to the partial table 16. When the pair is not present in the partial table 16, the CPU 11 may update the translation table 31.

After the CPU 11 updates MCA_lut, the CPU 11 deletes the pair of LCA_log and MCA_log stored by the process in S13 or the process in S33 (S47) and selects the next pair (S48). Then, the CPU 11 executes the process in S42. When MCA_log is not identical to MCA_lut (S45, No), the CPU 11 executes the process in S47.

As such, the CPU 11 determines whether the copied cluster data 22-1 is valid again. When the cluster data 22-1 which is copied by the write request from the host 2 after the process in S1 terminates is not valid, the copied cluster data 22-1 can be treated as invalid data.

When the invalid cluster data 22 is copied in the process of S2 by the second method, the copied invalid cluster data 22 is determined to be invalid in the process of S3 and the corresponding pair is not updated. Therefore, the invalid cluster data 22 is prevented from being treated as valid data.

As such, According to the embodiment of the present invention, when collecting the valid cluster data 22-1 from the written block 25-1, the CPU 11 determines whether the cluster data 22 in the written block 25-1 is valid, using the translation table 31, not the partial table 16. Therefore, the CPU 11 does not need to perform the process of referring to the storage position table 32 indicating whether the pair including the logical address to be translated is present partial table 16. It is possible to reduce the time required to determine a valid cluster.

During the valid cluster determination process, the CPU 11 accesses the DRAM 30 only once in order to refer to the translation table 31. Therefore, it is possible to reduce the number of times the CPU 11 accesses the DRAM 30, as compared to a case in which the CPU 11 executes two access operations including an access operation for referring to the storage position table 32. As a result, the time required to determine a valid cluster is reduced.

After copying data required for compaction, the CPU 11 preferentially uses the partial table 16 over the translation table 31 to determine whether the cluster data 22 which is copied by data copy is valid. An example in which the partial table 16 is preferentially used over the translation table 31 is as follows. When a pair of the logical addresses to be translated is present in the partial table 16, the partial table 16 is used. When the pair of the logical addresses to be translated is not present in the partial table 16, the translation table 31 is used. When the cluster data 22 which is copied by data copy is valid, the CPU 11 updates the partial table 16 or the translation table 31. When the cluster data 22 which is copied by data copy is invalid, the CPU 11 updates neither the partial table 16 nor the translation table 31. Therefore, even when invalid cluster data 22 is determined to be valid cluster data 22 by a valid cluster determination process without using the partial table 16 and data is copied, the copied cluster data 22 can be treated as invalid cluster data 22.

Figure 8:
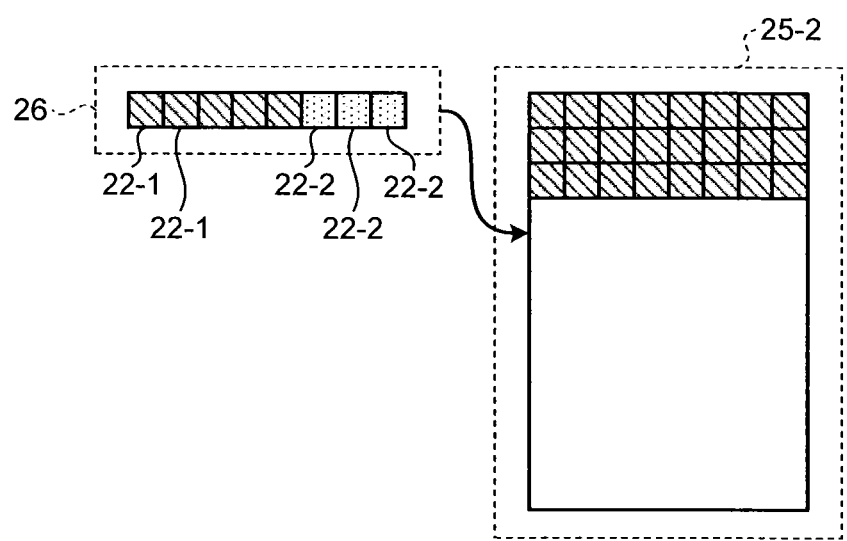
FIG. 8 is a diagram illustrating another example of the compaction.

In the above description, during compaction, the CPU 11 collects valid cluster data 22-1 to generate page data 26 and writes the generated page data 26 to the block 25-2. When the amount of valid cluster data 22-1 included in the written block 25-1 is small, the amount of valid cluster data 22-1 searched by the valid cluster determination process for a unit time is small. In this case, it takes a lot of time to generate the page data 26. When a portion of the page data 26 is generated and it is difficult to wait for the time required to search for the remaining page data, the CPU 11 may generate cluster data 22-2 with an invalid value as the remaining page data 26, as illustrated in FIG. 8 (third method). In this case, even when valid cluster data 22-1 which is not enough to generate the page data 26 is searched, the valid cluster determination process (S1) can be terminated in the middle and the processes in S2 and S3 can be performed. That is, according to the third method, since the valid cluster determination process (S1) can be terminated in the middle and processing of a write command from the host 2 can be started after the termination, it becomes possible to prevent response time for the write command from becoming abnormally long.

When the second and third methods are used, it is possible to increase the processing speed of the valid cluster determination process (S1) using the second method. Therefore, it is possible to reduce the number of times the valid cluster determination process (S1) is terminated in the middle, as compared to a case in which the first method is used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first memory that includes a plurality of first blocks to which data is written from the outside, erasing being performed for each first block;
   a second memory that stores a first table in which a plurality of first correspondences between a logical address and a physical address of a writing position of the data is described;
   a third memory that has a higher processing speed than the second memory and stores a second table in which second correspondences are described, the second correspondences being parts of the first correspondences; and
   a memory controller that preferentially uses the second table over the first table to acquire a physical address of an access destination when accessing the first memory in response to a request from the outside,
   wherein the memory controller determines whether data in a second block is first data to be copied, using the first table, not the second table, the second block is a written block among the plurality of first blocks, the memory controller copies the first data from the second block to a third block to copy all data in a first state in the second block to the third block, and the third block is a writable block among the plurality of first blocks, and the memory controller sets all data in the second block to a second state.

2. The memory system according to claim 1, wherein, in the plurality of first blocks, each data is written with a log indicating a logical address which is designated from the outside, and the memory controller acquires a first physical address of the writing position of the data in the second block and a first logical address indicated by the log, translates the first logical address into a second physical address using the first table, determines that the data in the second block is the first data when the first physical address is identical to the second physical address, and determines that the data in the second block is not the first data when the first physical address is not identical to the second physical address.

3. The memory system according to claim 2, wherein, after the memory controller copies the first data, the memory controller preferentially uses the second table over the first table to translate the first logical address into a third physical address, when the first physical address is identical to the third physical address, the memory controller updates the third physical address to a fourth physical address indicating the writing position of the first data in the third block in the first table or the second table, and when the first physical address is not identical to the third physical address, the memory controller does not update the third physical address in either of the first table and the second table.

4. The memory system according to claim 3, wherein the second memory stores a third table which specifies the second correspondences among the first correspondences, and the memory controller determines whether to use the second table or the first table with reference to the third table when translating the first logical address into the third physical address.

5. The memory system according to claim 1, wherein the second memory stores a third table which specifies the second correspondences among the first correspondences, and the memory controller determines whether to use the second table or the first table with reference to the third table when accessing the first memory in response to a request from the outside.

6. The memory system according to claim 1, wherein, when the designation of a second logical address and a second data write request are received from the outside and third data is present in the first memory, the third data being wrote with a designation of the second logical address, the memory controller changes the state of the third data from the first state to the second state, writes the second data to the first memory, and sets the second data to the first state.

7. A memory system comprising:

a first memory that includes a plurality of first blocks to which data is written from the outside, erasing being performed for each first block;

a second memory that stores a first table in which a plurality of first correspondences between a logical address and a physical address of a writing position of the data is described;

a third memory that has a higher processing speed than the second memory and stores a second table in which second correspondences are described, the second correspondences being parts of the first correspondences; and a memory controller that preferentially uses the second table over the first table to acquire a physical address of an access destination when accessing the first memory in response to a request from the outside, wherein the second memory stores a third table which specifies the second correspondences among the first correspondences, the memory controller accesses the second memory only once to determine whether data in the second block is first data to be copied, the second block is a written block among the plurality of first blocks, the memory controller copies the first data from the second block to a third block to copy all data in a first state in the second block to the third block, and the third block is a writable block among the plurality of first blocks, and the memory controller sets all data in the second block to a second state.

8. The memory system according to claim 7, wherein the one access is an access to refer the first table, in the plurality of first blocks, each data is written with a log indicating a logical address which is designated from the outside, and the memory controller acquires a first physical address of the writing position of the data in the second block and a first logical address indicated by the log, translates the first logical address into a second physical address using the first table, determines that the data in the second block is the first data when the first physical address is identical to the second physical address, and determines that the data in the second block is not the first data when the first physical address is not identical to the second physical address.

9. The memory system according to claim 8, wherein, after the memory controller copies the first data, the memory controller preferentially uses the second table over the first table to translate the first logical address into a third physical address, when the first physical address is identical to the third physical address, the memory controller updates the third physical address to a fourth physical address indicating the writing position of the first data in the third block in the first table or the second table, and when the first physical address is not identical to the third physical address, the memory controller does not update the third physical address in either of the first table and the second table.

10. The memory system according to claim 7, wherein the memory controller determines whether to use the second table or the first table with reference to the third table when accessing the first memory in response to a request from the outside.

11. The memory system according to claim 9, wherein the memory controller determines whether to use the second table or the first table with reference to the third table when translating the first logical address into the third physical address.

12. The memory system according to claim 7, wherein, when a second data write request including the designation of a second logical address is received from the outside and third data is present in the first memory, the third data being wrote with a designation of the second logical address, the memory controller changes the state of the third data from the first state to the second state, writes the second data to the first memory, and sets the second data to the first state.

13. A memory system comprising:

a first memory that includes a plurality of blocks;

a second memory that stores a group of a translation information which associates a logical address and a physical address; and a third memory that stores a portion of the group of the translation information, wherein, on generating a free block, data to be copied is determined by using the group of the translation information stored in the second memory, not the portion of the group of the translation information stored in the third memory.

\* \* \* \* \*